United States Patent
Jens et al.

(10) Patent No.: US 6,887,818 B2
(45) Date of Patent: May 3, 2005

(54) SUPPORTED TITANIUM CATALYST SYSTEM

(75) Inventors: Klaus Jens, Langesund (NO); Arild Follestad, Stathelle (NO); Siw Bodil Fredriksen, Skien (NO); Richard Blom, Oslo (NO); Ivar Martin Dahl, Oslo (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/381,478
(22) PCT Filed: Sep. 27, 2001
(86) PCT No.: PCT/GB01/04341
§ 371 (c)(1), (2), (4) Date: Apr. 18, 2003
(87) PCT Pub. No.: WO02/26837
PCT Pub. Date: Apr. 4, 2002

(65) Prior Publication Data
US 2004/0014912 A1 Jan. 22, 2004

(30) Foreign Application Priority Data
Sep. 27, 2000 (GB) .............................. 0023662

(51) Int. Cl.[7] .............................. C08F 4/02; C08F 4/42
(52) U.S. Cl. ................... 502/113; 502/103; 502/152; 502/87; 502/132; 526/160; 526/943; 526/113; 526/124.1

(58) Field of Search .................. 502/113, 103, 502/152, 87, 132; 526/160, 943, 113, 124.1

(56) References Cited

U.S. PATENT DOCUMENTS

| | | | |
|---|---|---|---|
| 4,147,664 A | | 4/1979 | Pomogailo et al. |
| 4,161,462 A | | 7/1979 | Bocharov et al. |
| 4,623,707 A | * | 11/1986 | Bedell et al. ............... 526/142 |
| 6,100,214 A | | 8/2000 | Walzer, Jr. et al. |
| 6,423,660 B1 | * | 7/2002 | Albizzati et al. ........... 502/109 |

FOREIGN PATENT DOCUMENTS

| | | | |
|---|---|---|---|
| EP | 0633272 A | | 1/1995 |
| EP | 0 633 272 | * | 1/1995 |
| EP | 0 757 992 | * | 2/1997 |
| EP | 0757992 A | | 2/1997 |
| EP | 0 767 184 | * | 4/1997 |
| EP | 0767184 A | | 4/1997 |
| WO | 95/23816 A | | 8/1995 |
| WO | WO 95/23816 | * | 9/1995 |
| WO | WO 96/30122 | * | 10/1996 |
| WO | 96/30122 A | | 10/1996 |
| WO | WO 01/21673 | * | 3/2001 |
| WO | WO 01/21673 A1 | | 3/2001 |

* cited by examiner

*Primary Examiner*—Ling-Siu Choi
(74) *Attorney, Agent, or Firm*—Nixon & Vanderhye P.C.

(57) ABSTRACT

A supported titanium catalyst system comprising a titanium catalyst bound via at least one heteroatom, a functionalized support, said heteroatom being connected to said support via an organic group.

17 Claims, 1 Drawing Sheet

SUPPORTED TITANIUM CATALYST SYSTEM

This application is the US national phase of international application PCT/GB01/04341 filed 27 Sep. 2001, which designated the US.

This invention relates to a new supported catalyst system capable of producing polyolefins having a broad or narrow molecular weight distribution, and in particular to a titanium catalyst supported on a functionalised carrier which optionally has impregnated therein a polymerisation active metal complex, e.g. a metallocene.

The use of titanium and metallocene catalysts for the polymerisation of olefins is well established in the art. Numerous documents describe the use of titanium catalysts either alone, or more conventionally supported on a carrier, e.g. an oxide support such as silica or alumina. Such supported catalyst systems are used either without a cocatalyst or with a metal alkyl cocatalyst as is well known in the art. Titanium catalysts are also widely employed in Zielger systems often in combination with magnesium chloride. Metallocene catalysts are also widely employed and are conventionally used in combination with a cocatalyst as is well known in the art.

Conventional polyethylenes have varying molecular weights and molecular weight distributions. The polymer chemist is constantly striving for ways in which to tailor specifically the molecular weight and molecular weight distribution of polymer products since adjusting such properties allows the formation of polymers having very different properties. Typically, molecular weight is adjusted by varying the concentration of monomers and hydrogen within the reactor. It is also known that certain types of olefin polymerisation catalysts tend to give rise to polymers having particular weight distributions. For example, Zielger-Natta catalysts tend to give polymers having relatively broad molecular weight distribution.

It would be desirable if a catalyst system could be found which allowed the production of polymers with varying Mw/Mn values simply by varying the nature of the support.

It has now been surprisingly found that by supporting titanium catalyst precursors on certain functionalised polymer supports, a polyolefin product may ultimately be produced having tailorable molecular weight depending on the nature of the functionalised support.

It is also known to combine different catalysts to form dual-site or multi-site catalyst systems. Such catalyst systems offer the skilled polymer chemist more scope for tailoring the properties of the eventual polymer product since each site within the dual-site catalyst may give rise to a polymer component having particular properties, e.g. desired mechanical or optical properties.

The skilled polymer chemist is again constantly striving for new ways in which to control further the properties of the polymers produced. By changing the nature of the catalyst system polymers with greatly differing properties may be produced. It is well known that hydrogen may be employed to control the molecular weight of polymers produced using a catalyst system which is sensitive to hydrogen. It is thus possible to cause the formation of a low molecular weight polymer by carefully adjusting hydrogen concentration during polymerisation. However it is often desirable to produce polymers having both high and low molecular weight components, i.e. polymers having bimodal or multimodal molecular weight distributions.

Bimodal or multimodal polyolefins may be prepared by melt blending; however to ensure satisfactory homogeneity it is preferred to use a multi-stage polymerization process, e.g. using two or more reactors in series, to produce bimodal or multimodal polyolefins.

Bimodal or multimodal polyolefins are advantageous in that they may combine the good mechanical properties associated with a high molecular weight component with the processability associated with a low molecular weight component. It would be useful if a catalyst system were available which comprised two sites, one of which was sensitive to hydrogen concentration, the other of which was essentially unaffected by the amount of hydrogen present.

There is however, a problem in that the low and high molecular weight fractions may give smell and gel problems and hence it would also be desirable if the high and low molecular weight fractions could themselves is be manufactured to possess narrow molecular weight ranges thus avoiding the low molecular weight tail associated with intolerable smells and very high molecular weight fractions which may form gels.

Figure 1:
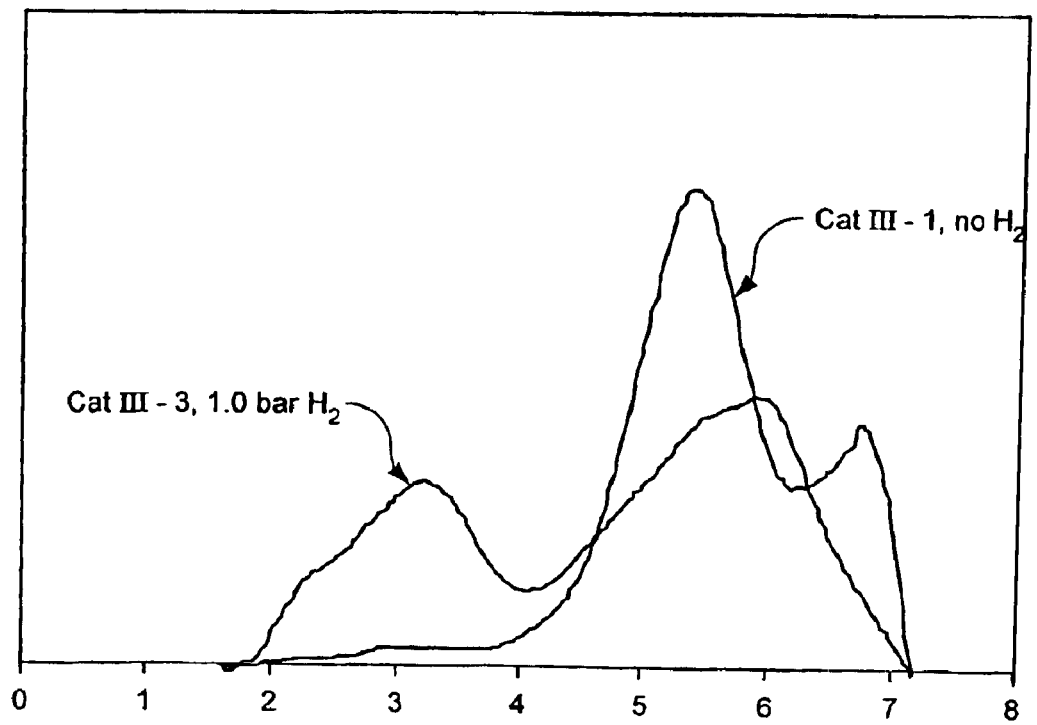
FIG. 1 depicts the MWD curves from GPC analysis for polymer produced with Catalyst III (Example 3) with and without hydrogen.

It has also been surprisingly found that by supporting titanium catalyst precursors on functionalised polymer supports in which a polymerisation active metal complex, e.g. metallocene catalyst has been impregnated, a dual-site catalyst system may be formed which comprises a site which is sensitive to hydrogen and a site which is less sensitive to hydrogen concentration. Moreover, polymers made using such a catalyst system may be bimodal and may have higher and lower molecular weight components wherein each component may have relatively narrow molecular weight distribution.

The polymer support used in the present invention may for example be a functionalised polystyrene as described in U.S. Pat. No. 4,623,707. This Patent teaches the use of a functionalised polystyrene carrier in supporting a Ziegler-Natta catalyst and is herein incorporated by reference. However, whilst the functionalised supports have previously been described, never before have they been proposed for use with a titanium catalyst precursor and optionally a polymerisation active metal complex, allowing the formation of polyolefins having highly controllable molecular weight distributions.

Thus, viewed from one aspect the invention provides a supported titanium catalyst system comprising a titanium catalyst bound via at least one heteroatom, e.g. a nitrogen, sulphur or oxygen atom, to a functionalised support, said heteroatom being connected to said support via an organic group. Optionally, said support has impregnated therein a polymerisation active metal complex, e.g. a metallocene.

Viewed from another aspect the invention provides a process for the preparation of a supported catalyst system comprising:

(I) reacting a titanium catalyst precursor with a functionalised support in a solvent to bind said titanium catalyst precursor to said functionalised support via at least one heteroatom, e.g. a nitrogen, sulphur or oxygen atom, attached to said support via an organic group;

(II) optionally impregnating said support with a polymerisation active metal complex, e.g. a metallocene; and (III) recovering a supported catalyst as a free-flowing solid or slurry.

Viewed from yet another aspect the invention provides the use of a supported catalyst system as hereinbefore described in the polymerisation of olefins.

Viewed from still yet another aspect the invention provides a method of polymerisation comprising polymerising at least one olefin in the presence of a supported catalyst system as hereinbefore described.

Viewed from a yet further aspect the invention provides polyolefins prepared using the supported catalyst system as hereinbefore described.

The titanium catalyst precursor may be selected from a wide variety of suitable precursors readily determined by the person skilled in the art. The titanium ion should preferably be in the 3+ or 4+ oxidation state.

In one embodiment, the titanium catalyst precursor should carry at least one, e.g. two groups which are capable of being displaced by the heteroatoms present on the support. Suitable leaving groups will be readily determined by the artisan. For example, suitable titanium catalyst precursors include those of formula (I)

$$TiA_x \qquad (I)$$

wherein each A independently represents any group or groups which remain bound to the titanium after contact with the support or a leaving group which may be displaced by reaction with the support; and x is an integer of 3 or 4. Suitable groups A therefore include an η-ligand, for example an open chain $\eta^3$, $\eta^4$ or $\eta^5$ ligand or a closed ring $\eta^5$ ligand such as cyclopentadienyl, indenyl, or fluorenyl ligand, halogen (e.g. chlorine, bromine or iodine, especially chlorine), alkenyl (e.g. allyl or substituted allyl, e.g. 2-methyl allyl), siloxy, alkyl, alkoxy, amido and cyclopentadienyl. At least one group A must of course be capable of being displaced by an active group on the support surface.

By leaving group is meant a group which is capable of being displaced by a heteroatom attached via an organic group to the support.

Where A represents a closed ring $\eta^5$ ligand, this may be, for example, of formula II $$CpY_m \qquad (II)$$

where Cp is an unsubstituted, mono-substituted or polysubstituted homo or heterocyclic cyclopentadienyl, indenyl, tetrahydroindenyl, fluorenyl, benzindenyl, cyclopenta[1] phenanthrenyl, azulenyl, or octahydrofluorenyl ligand or a heterocyclic analog thereof, e.g. containing a ring nitrogen, boron, sulphur or phosphorus; m is zero or an integer having a value of 1, 2, 3, 4 or 5; and where present each Y which may be the same or different is a substituent attached to a ring atom of Cp and selected from halogen atoms, and alkyl, alkenyl, aryl, aralkyl, alkoxy, alkylthio, alkylamino, (alkyl)$_2$P, siloxy (e.g. alkylsiloxy), germyloxy (e.g. alkylgermyloxy), acyl and acyloxy groups or one Y comprises an atom or group providing an atom chain comprising 1 to 4 atoms selected from C, O, S, N, Si, Ge and P, especially C and Si (e.g. an ethylene group) to a second η-ligand of formula II, e.g. an unsubstituted, mono-substituted or polysubstituted homo or heterocyclic cyclopentadienyl, indenyl, tetrahydroindenyl, fluorenyl or octahydrofluorenyl ligand group.

In the compounds of formula I and II unless otherwise specified any hydrocarbyl moiety preferably contains up to 20 carbon atoms, more preferably up to 10 carbons, especially up to 6 carbons.

In the η-bonding ligands of formula II, the rings fused to the homo or hetero cyclopentadienyl rings may themselves be optionally substituted e.g. by halogen atoms or hydrocarbyl groups containing 1 to 20 carbon atoms.

Many examples of such η-bonding ligands and their synthesis are known from the literature, see for example: M öhring et al. J. Organomet. Chem 479:1–29 (1994), Brintzinger et al. Angew. Chem. Int. Ed. Engl. 34:1143–1170 (1995).

Examples of suitable η-bonding ligands include the following:

cyclopentadienyl, indenyl, fluorenyl, pentamethyl-cyclopentadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indenyl, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

Where the titanium species binds to more than one heteroatom present on the support, it is, of course, possible for one titanium:support heteroatom bond to be formed in a vacant titanium coordination site whilst the other titanium:support heteroatom bond is formed via displacement of a leaving group present in the catalyst precursor.

The bonds between the heteroatoms present on the catalyst support and the titanium catalyst precursor preferably form directly from the titanium ion, i.e. a titanium ion to heteroatom bond. The titanium ion may be in any convenient oxidation state, e.g. 0, 3 or especially 4.

Preferred titanium catalyst precursors are titanium halides, titanium alkoxides, titanium amides, titanium alkyls, and combinations thereof. Preferably, the titanium catalyst precursor is a titanium tetrahalide, especially titanium tetrachloride.

The support may be impregnated with a polymerisation active metal complex, e.g. a metallocene. Suitable metallocene catalysts for use in the invention may be any conventional metallocene catalyst. As used herein, the term metallocene is used to refer to all catalytically active metal:η-ligand complexes in which a metal is complexed by one, two or more open chain or closed ring η-ligands. The use of bridged bis-η-ligand metallocenes, single η-ligand "half metallocenes", and bridged η-σ ligand "scorpionate" metallocenes is particularly preferred. The metal in such complexes is preferably a group 4, 5, 6, 7 or 8 metal or a lanthanide or actinide, especially a group 4, 5 or 6 metal, particularly Zr, Hf or Ti. The η-ligand preferably comprises an $\eta^4$ or $\eta^5$ open chain or an $\eta^5$-cyclopentadienyl ring, optionally with a ring or chain carbon replaced by a heteroatom (e.g. N, B, S or P), optionally substituted by pendant or fused ring substituents and optionally linked by bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Suitable η-ligands, include those of formula II discussed above. Examples of such homo or heterocyclic cyclopentadienyl ligands are well known in the art (see e.g. EP-A-416815, WO96/04290, EP-A-485821, EP-A-485823, U.S. Pat. Nos. 5,276,208 and 5,145,819).

Besides the η-ligand, the metallocene complex used according to the invention may include other ligands; typically these may be halide, hydride, alkyl, aryl, alkoxy, aryloxy, amide, carbamide or other two electron donor groups. Any hydrocarbyl ligand here will generally contain up to 20 carbons, preferably up to 10 carbons, e.g. up to 6 carbons. Aryl ligands may have from 6 to 20 ring carbon atoms, preferably 6 to 10 ring carbon atoms.

The terms "support" or "carrier" are used interchangeably herein to mean any material capable of supporting catalytically active compounds. The support material for use in the invention preferably comprises an organic polymer, preferably an organic porous polymer provided in the form of distinct particles. Preferably, the support material will comprise porous polymer particles optionally cross-linked by physical or chemical means, for example using conventional cross-linking agents, e.g. divinylbenzene. Preferred support materials include acrylate polymer particles or styrene-divinylbenzene polymer particles. The optionally cross-linked polymer backbone may be considered to form the support.

As used herein, the term "functionalised support" is used to define any support which has been functionalised so as to carry heteroatoms on its surface capable of forming a chemical bond with the titanium catalyst precursor. Examples of suitable functionalised supports are therefore those which carry at least one XH group in which each X is independently an organic group and H is an active hydrogen atom attached to a heteroatom in the organic group X, the heteroatom having at least one electron pair available for coordination to the precursor. Suitable heteroatoms which may be present in the organic group X are those of groups 15 and 16 of the Periodic Table, preferably, O, P, S and N, particularly O.

Preferred functionalised supports for use in the invention are those having a $pK_a < 30$, preferably <25, more preferably <20. Particularly preferred for use in the invention are organic polymer supports carrying —OH, —N(alkyl)H or —NH$_2$ groups.

Especially preferred for use in the invention are polymer supports comprising divinylbenzene cross-linked polystyrene particles modified to carry functional hydroxy groups. Functional groups available as attachment sites may be introduced by conventional techniques, for example using a functionalised monomer when preparing the co-polymer. Alternatively, functional groups may be introduced by appropriate modification (e.g. chemical modification) of a non-functionalised co-polymer. Functionalised supports for use in the invention may, for example, be prepared in a manner analogous to that described by Ellingsen et al., J. Chrom. 535:147, 1990.

The use of a polymeric support, as opposed to a conventional silica support is also believed to give rise to polymers suitable for use in electrical insulation applications. The use of silica particles in a polymerisation catalyst may give rise to "cracks" in the eventual polymer through which moisture or water may be able to seep. Such polymers are therefore unsuitable for protecting electrical cables and cannot act as insulators. The functionalised supports of the present invention are believed to give rise to polymers free from such cracks and therefore have wide spread applications in the field of electrical insulation.

When the titanium catalyst precursor is bound to the support via two or more heteroatoms, the heteroatoms which bind to the titanium catalyst precursor may be attached to the functionalised support by separate organic groups, or may be bound to two heteroatoms which form part of the same organic group, e.g. the hydroxyl groups present in a diol.

Suitable organic groups XH include $C_{1-10}$ alcohols, especially $C_{1-6}$ alcohols, $C_{1-10}$ amines, especially $C_{1-6}$ amines, $C_{1-10}$ thiols, especially $C_{1-6}$ thiols, optionally substituted aryl groups carrying NH, OH or SH moieties, e.g. benzyl alcohol, phenol, aniline all preferably bound to the Support by the 4-position of the benzene ring. Further suitable groups will be readily determined by the skilled artisan.

It is of course possible for the XH group to have two or more heteroatoms and the titanium catalyst precursor may bind to one or both heteroatoms on the same organic group. Suitable XH groups in this regard include diamines and diols such as (1,2-dihydroxyethyl)phenyl or ethylene glycol.

Where the XH group carries a single heteroatom and the titanium catalyst precursor has two sites available for binding heteroatoms it is obviously more likely that the titanium catalyst precursor will bond to two heteroatoms on adjacent XH groups if there is a high surface density of XH groups present on the support. If there is a low surface density of XH groups then it is envisaged that the titanium catalyst precursor will bind to a single XH group irrespective of whether it carries further possible coordination sites.

Without wishing to be limited by theory it is envisaged that where the catalyst precursor binds to a diol present on the support surface, the resulting polymer may have a broader molecular weight distribution. Where the catalyst precursor binds to a single heteroatom present on the support surface it is envisaged that a polymer with a narrower molecular weight distribution will result.

The catalysts described above may be used in combination with a cocatalyst or catalyst activator. The terms "cocatalyst" and "activator" are used interchangeably herein to define any compound or component which is capable of activating a titanium catalyst precursor following attachment to the support or capable of activating the polymerisation active metal complex. The activator compound should preferably be one capable of stabilising a titanium catalyst without affecting its ability to function as a catalyst and must be sufficiently labile to permit displacement by an olefin monomer or other polymerisable species during polymerisation. Preferably the supported activator will be non-coordinating or weakly coordinating towards the titanium.

Advantageously, the catalyst system herein described may be used in the absence of a co-catalyst. However, for certain systems, e.g. those in which halogen groups are present a cocatalyst may be used. Suitable cocatalysts are well known and include alkyl metal compounds, in particular alumoxanes. Suitable alumoxanes include $C_{1-10}$ alkyl alumoxanes, e.g. methyl alumoxane (MAO) and isobutyl alumoxanes (e.g. tetra and hexaisobutyl alumoxane, TIBAO and HIBAO), especially MAO. Alumoxane co-catalysts are described by Hoechst in WO-A-94/28034. These are linear or cyclic oligomers having up to 40, preferably 3 to 20, —[Al(R")O]— repeat units (where R" is hydrogen, $C_{1-10}$ alkyl, preferably methyl, or $C_{6-18}$ aryl or mixtures thereof).

The supported catalyst of the invention may be prepared by combining the functionalised support and the titanium catalyst precursor in a solvent.

Suitable solvents for use in the methods of the invention include aliphatic and alicyclic hydrocarbons such as isobutane, butane, pentane, hexane, heptane, cyclohexane, cycloheptane etc. and aromatic compounds such as benzene, toluene, xylene etc. Reactions are conveniently carried out in an inert, moisture-free, oxygen-free environment due to the sensitivity of the catalyst components to moisture and oxygen. Preferably the addition of the titanium catalyst precursor to the support takes place at low temperature e.g. between −90 to 100° C., preferably between −50 and 30° C., preferably at ambient temperature.

Where required, the polymerisation active metal complex is conveniently impregnated into the support after the titanium catalyst precursor has been bound to the support surface. Preferably, the polymerisation active metal complex is added to the dried support complex in toluene optionally in the presence of a cocatalyst, e.g. MAO. After impregnation the final supported catalyst system may be conveniently dried in vacuo or may be used kept in a slurry state for direct use.

Where a cocatalyst is being employed this may conveniently be added to the supported titanium catalyst system by standard procedures. For example, MAO may be added to the carrier in toluene.

The supported titanium catalysts herein described may be used to polymerise any olefin or mixture of olefins, for example optionally substituted $C_{2-30}$ α-olefins. $C_{2-8}$ α-olefins and mixtures thereof, e.g. $C_2$- or $C_3$-olefins, are particularly preferred. The process of the invention is particularly suitable for the polymerisation of α-olefins such as ethylene, propylene, 1-butene, 1-pentene, 1-hexene, 3-methyl-1-butene and 4-methyl-1-pentene, especially preferably ethylene.

The catalyst systems may be used in any polymerisation or pre-polymerisation process, e.g. gas, slurry or solution phase. Preferably, these will be used in gas or slurry phase reactors. Polymerisation according to the invention may be performed using standard polymerisation techniques and using conventional polymerisation reactors, e.g. loop reactors, gas phase reactors, or stirred tank reactors.

The polymerisation process of the invention is typically conducted in the presence of a diluent. As a diluent, a linear, branched or cyclic saturated hydrocarbon such as butane, propane, pentane, hexane, heptane, octane, cyclohexane or methylcyclohexane, or an aromatic hydrocarbon such as benzene, toluene, xylene or ethylbenzene, or a chlorinated hydrocarbon such as chloroform, methylene chloride, dichloroethane, trichloroethane or tetrachloroethane, or chlorinated aromatic hydrocarbon such as chlorobenzene or dichloro-benzene, may be used. Of these compounds, aromatic hydrocarbons, in particular toluene are preferred.

The supported catalysts are most usefully employed in either gas or slurry phase processes, both of which are well known in the art. The temperature of the polymerisation reaction will typically be in the range of from 0 to 300° C., preferably from 60 to 120° C. The pressure employed for the olefin or olefins is typically from 1 to 2000 bars, preferably from 5 to 20 bars. The residence time is generally from 1 minute to 20 hours, preferably from 0.5 to 6 hours.

For slurry reactors, the reaction temperature will generally be in the range 60 to 110° C. (e.g. 85–110° C.), the reactor pressure will generally be in the range 5 to 80 bar (e.g. 25–65 bar), and the residence time will generally be in the range 0.3 to 5 hours (e.g. 0.5 to 2 hours). The diluent used will generally be an aliphatic hydrocarbon having a boiling point in the range −70 to +100° C., especially isobutane.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen together with monomer (e.g. ethylene or propylene and/or other comonomers).

As previously mentioned, polyolefins produced by the supported catalyst system of the invention have tailorable molecular weight distributions, e.g. $M_w/M_n=1$ to 100, preferably 3 to 80. Also, the product polyolefins have an $MFR_{21}/MFR_2<200$ and an $MFR_2<50$.

Moreover it has surprisingly been found that the electrical properties of the polyolefins prepared using the supported catalyst system of the invention are advantageous.

The polymers produced in accordance with the invention may be formulated together with conventional additives, e.g. antioxidants, UV-stabilizers, colors, fillers, plasticizers, etc. and can be used for fibre or film extrusion or for raffia, or for pipes, or for cable or wire applications or for moulding, e.g. injection moulding, blow moulding, rotational moulding, etc., using conventional moulding and extrusion equipment.

The invention will now be described further by way of the following non-limiting Examples and Figure in which FIG. 1 depicts the MWD curves from GPC analyses for polymer produced with Catalyst III (Example 3) with and without hydrogen.

Experimental

In the following Examples, the following particulate functionalized organic polymers were used as supports:

Support A: Support A is a p-(1,2-dihydroxyethyl)styrene-co-styrene-co-divinylbenzene polymer prepared by copolymerising p-(1,2-dihydroxyethyl)styrene, styrene and divinylbenzene. The particles formed, has a degree of crossbinding of 71%, a porosity of 70% and an average particle diameter of 30 microns. The amount of hydroxy groups measured was 0.80 mmol OH/g.

Support B: Support B is a p-(1,2-dihydroxyethyl)styrene-co-styrene-codivinylbenzene polymer prepared by copolymerising p-(1,2-dihydroxyethyl)styrene, styrene and divinylbenzene in a similar manner as for Support A. The amount of hydroxy groups measured was 0.88 mmol OH/g.

In all instances melt index (MI) and high load melt index were measured using standard conditions; i.e. MI at 190° C., 0.0825 in orifice, 2.16 kg load; HLMI at 190° C., 0.0825 in orifice, 21.6 kg load.

EXAMPLE 1

Preparation of Catalyst I 1.22 g Support A containing 0.40 mmol diol/g was suspended in 25 ml pentane. After cooling to −78° C., 53.54 μl $TiCl_4$ (0.4 mmol) was added as a pentane solution by syringe. After 30 minutes reaction at low temperature, the temperature was slowly raised to ambient over about two hours before the suspension was filtrated slowly. The yellow-brown solid was dried under reduced pressure. Yield: 1.17 g stored in a glove box.

EXAMPLE 2

Preparation of Catalyst II 0.550 g of Catalyst I was added to a Schlenck tube containing a magnetic stirrer under argon atmosphere. In a separate Thomas bottle 12 mg $(nBuCp)_2ZrCl_2$ was dissolved in 4.0 ml toluene. In a second Thomas bottle, 10 ml toluene and 3.50 ml MAO/toluene (13.1 wt % Al) was mixed. To this second Thomas bottle 1.39 ml of the solution containing (nBuCp)$_2$ZrCl$_2$ was added. After about 15 minutes reaction 0.66 ml of this solution was added drop-wise by syringe to the sample of Catalyst I while stirring. Finally the powder was dried for a short time under vacuum yielding 0.93 g of catalyst.

EXAMPLE 3
Preparation of Catalyst III 0.600 g Catalyst I was added to a Schlenck tube containing a magnetic stirrer under argon atmosphere. In a separate Thomas bottle 12 mg (nBuCp)$_2$ZrCl$_2$ was dissolved in 4.0 ml toluene. In a second Thomas bottle, 10 ml toluene and 6.55 ml MAO/toluene (13.1 wt % Al) was mixed. To this second Thomas bottle 2.61 ml of the solution containing (nBuCp)$_2$ZrCl$_2$ was added. After about 15 minutes reaction 0.72 ml of this solution was added drop-wise by Syringe to the sample of Catalyst I while stirring. Finally the powder was dried for a short time under vacuum yielding 1.00 g catalyst.

EXAMPLE 4
Ethylene Polymerization

Ethylene was polymerized using the catalysts of Examples 2 and 3. Details are set out in Tables 1 to 3 below.

TABLE 1

Catalyst parameters for the dual site catalysts of Examples 2 and 3

| Catalyst | wt % Ti | wt % Zr | Al/Ti | Al/Zr |
|---|---|---|---|---|
| II | 1.9 | 0.0076 | 3.2 | 1450 |
| III | 1.9 | 0.011 | 4.5 | 1450 |

TABLE 2

Polymerisation conditions and activity data from polymerisations with the heterogeneous catalysts of Examples 2 and 3. Polymerisations in a 1-liter autoclave with 0.5-L isobutane as diluent at 38 bar total pressure, 90° C.

| Catalyst | H$_2$ bar | 1-Hexene ml | m$_{cat}$ mg | time min | Yield PE g | Activity g/(g$_{cat}$ · h) | Density g/cm$^3$ |
|---|---|---|---|---|---|---|---|
| II-1 | 0 | 0 | 235 | 60 | 24.0 | 102 | 0.935 |
| II-2 | 1.0 | 0 | 300 | 60 | 13.6 | 45 | 0.943 |
| III-1 | 0 | 0 | 250 | 45 | 37.5 | 203 | 0.938 |
| III-2 | 1.0 | 0 | 257 | 60 | 21.0 | 82 | 0.948 |
| III-3 | 1.0 | 10.0 | 310 | 60 | 19.7 | 64 | 0.946 |

Morphology was in all cases found to be excellent.

TABLE 3

Characteristics of polymer produced with heterogeneous catalysts of Examples 2 and 3. Polymerisations in a 1-liter autoclave with 0.5-L isobutane as diluent at 38 bar total pressure, 90° C.

| Catalyst | MI g/10 min | HLMI g/10 min | HLMI MI | Density g/cm$^2$ | M$_w$/ 10$^3$ | M$_w$/M$_n$ |
|---|---|---|---|---|---|---|
| II-1 | 0.002 | 0.18 | 90 | 0.935 | — | — |
| II-2 | 0 | 0.055 | — | 0.943 | — | — |
| III-1 | 0.007 | 0.47 | 67 | 0.938 | 1135 | 38 |
| III-2 | 0 | 0.21 | — | 0.948 | — | — |
| III-3 | 0.008 | 0.44 | 52 | 0.946 | 610 | 260 |

EXAMPLE 5
Titanium Based Single Site Catalysts

A catalyst which comprises a di-alkoxy titanium fragment can be prepared by reaction of TiCl$_4$ with Support B which contains 4-(1,2-dihydroxy-ethyl)phenyl groups, i.e. diol groups.
Preparation of Catalyst IV 0.500 g Support B containing 0.22 mmol diol fragments was suspended in 25 ml pentane and cooled to −78° C. A pentane solution containing 0.22 mmol TiCl$_4$ (taken from a solution made from 242 µl TiCl$_4$ in 10 ml pentane) was then added with a syringe while stirring. After two hours the suspension was slowly heated to ambient temperature over a period of 2 hours. The suspension was filtered, and the solid was dried under reduced pressure, yielding 0.48 g of a yellow-brownish powder. Stored in the glove box.

EXAMPLE 6
Polymerisation with Catalyst IV

Polymerisation was carried out in a 1 litre stainless steel autoclave equipped with a magnadrive stirring unit. 0.5 litre isobutane was used as diluent. First the catalyst was charged to the reactor. Then the wanted amount of MAO/toluene was added together with the isobutane, before the reactor was pressurised to 38 bar total pressure with ethylene.

EXAMPLE 7
Preparation of Catalyst V 350 mg Catalyst IV was added 10 ml of a MAO/toluene solution containing 7.4 wt % Al at ambient temperature while stirring. The solution turned immediately brownish. After 15 minutes reaction time the suspension was filtrated, and the solid rest was washed twice with 15 ml portions of pentane. The filtrate was olive-brown, while the solid rest was grey-brown. Drying under reduced pressure yielded 0.56 g powder. Stored in the glove box.

EXAMPLE 8
Polymerisation with Catalyst V

Was carried out in a similar manner as with Catalyst IV, except that no MAO was added separately to the reactor.

EXAMPLE 9
Preparation of Catalyst VI

Catalyst VI was prepared in the same manner as Catalyst IV although employing a more dilute MAO solution.

EXAMPLE 10
Preparation of Catalyst VII 350 mg Catalyst VI was suspended in 10 ml toluene. Then 6.4 ml MAO/toluene (7.4 wt % Al) was added while stirring. The suspension turned olive. After 0.5 hours reaction time the suspension was filtrated yielding an olive filtrate as observed for Catalyst V. The solid was washed twice with 15 ml portions of pentane, then dried under reduced pressure. Yield: 0.58 g grey-brown powder. Stored in the glove box.

EXAMPLE 11
Polymerisation with Catalyst

Polymerisation was carried out in a similar manner as for Catalyst V, but either a constant D$_2$ flow of 0.2% for the ethylene flow was used, or 2.0 bar D$_2$ was added from the beginning of the polymerisation as noted in Table 4.

EXAMPLE 12
Preparation of Catalyst VIII 320 mg Catalyst VI containing 0.13 mmol Ti was suspended in 15 ml toluene. Then 21 µl (0.14 mmol) ethylbenzoate was added with a syringe while stirring. After one hour reaction time, 6.4 ml MAO/toluene (7.4 wt % Al) was added in a similar manner as described for Catalyst V. Filtration, washing of the solid rest twice with 15 ml portions of pentane yielded 0.485 g greyish powder. Stored in the glove box.

EXAMPLE 13

Polymerisation with Catalyst VIII

Polymerisation was carried out in a similar manner as for Catalyst VII.

The results from the polymerisation tests are summarised in Table 4 below.

TABLE 4

Results from polymerisations with heterogeneous catalysts based on TiCl$_4$/Support B Polymerisations in a 1-liter autoclave with 0.5-I isobutane as diluent at 38 bar total pressure, 80° C.

| Catalyst | D$_2$ | m$_{cat}$ mg | time min | Yield PE g | Activity g/(g$_{cat}$ · h) | Activity g/ (mmol$_{Ti}$ · h) | HLMI | Morphology 0–6 |
|---|---|---|---|---|---|---|---|---|
| IV† | 0 | 104 | 36 | 42.8 | 686 | 1769 | nf‡ | 6 (low b.d.) |
| V | 0 | 172 | 60 | 28.6 | 166 | — | nf‡ | 6 |
| V | 0 | 176 | 60 | 34.0 | 193 | — | nf‡ | 5 |
| VII | 0.2% | 163 | 60 | 35.4 | 217 | — | nf‡ | 6 |
| VII# | 0.2% | 153 | 60 | 21.0 | 137 | — | 0.003 | 6 |
| VIII | 2 bar | 160 | 60 | 11.8 | 74 | — | 0.017 | 6 |

‡nf = no flow
†= MAO added to the reactor.
= Also 10 ml 1-hexene added.

It should also be noted that even with 2.0 bar deuterium from the beginning of the polymerisation, the increase in HLMI was minor. These comparative catalysts really appear to make high molecular weight polyethylene, even in the presence of hydrogen/deuterium.

What is claimed is:

1. A supported titanium catalyst system comprising a cocatalyst and a titanium catalyst directly bound via at least two heteroatoms to a functionalised support, said heteroatoms being connected to said support via at least one organic group, wherein said support has impregnated therein a polymerisation active metal complex.

2. A supported titanium catalyst system as claimed in claim 1 wherein said titanium catalyst is derived from a compound of formula (I)

$$TiA_x \qquad (I)$$

wherein each A independently represents an open chain $\eta^3$, $\eta^4$ or $\eta^5$-ligand or a closed ring $\eta^5$-ligand, halogen, alkenyl, siloxy, alkyl, alkoxy or amido;

x represents 3 or 4;

at least one group A being capable of being displaced by a heteroatom attached via an organic group to the support.

3. A supported titanium catalyst system as claimed in claim 2 wherein x is 4.

4. A supported titanium catalyst system as claimed in claim 2 wherein each A independently represents halogen, alkoxy, amido or alkyl.

5. A supported titanium catalyst system as claimed in claim 4 wherein all A substituents are the same.

6. A supported titanium catalyst system as claimed in claim 5 wherein said compound of formula (I) is TiCl$_4$.

7. A supported titanium catalyst system as claimed in claim 1 wherein said support comprises acrylate polymer particles or styrene-divinylbenzene polymer particles.

8. A supported titanium catalyst system as claimed in claim 1 wherein said support comprises at least one group X⊕ wherein X⊕ represents an organic group comprising a heteroatom.

9. A supported titanium catalyst system as claimed in claim 8 wherein X⊕ represents a deprotonated C$_{1-10}$ alcohol, C$_{1-10}$ amine, C$_{1-10}$ thiol, an aryl group bound to an NH, SH or OH group, C$_{1-10}$ diol or C$_{1-10}$ diamine.

10. A supported titanium catalyst system as claimed in claim 9 wherein X⊕ comprises a deprotonated OH, —N(alkyl)H or —NH$_2$ groups.

11. A supported titanium catalyst system as claimed in claim 10 wherein X⊕ represents a deprotonated benzyl alcohol or 1,2-dihydroxyethyl phenyl.

12. A supported titanium catalyst system as claimed in claim 8 wherein X⊕ represents a deprotonated C$_{1-10}$ alcohol, C$_{1-10}$ amine, C$_{1-10}$ thiol, an aryl group bound to a C$_{1-10}$ diol or C$_{1-10}$ diamine.

13. A supported titanium catalyst system as claimed in claim 11 wherein the benzyl alcohol or 1,2-dihydroxyethyl phenyl group is bound to the support via the 4-position on the phenyl ring.

14. A supported titanium catalyst system as claimed in claim 1 wherein said polymerisation active metal complex is a metallocene.

15. A supported titanium catalyst system as claimed in claim 14 wherein said metallocene is (nBuCp)$_2$ZrCl$_2$.

16. A supported titanium catalyst system comprising a cocatalyst and a titanium catalyst directly bound via an oxygen atom to a functionalised support, said oxygen atom being connected to said support as part of a benzyl alcohol, ethylene glycol or 1,2-dihydroxyethylphenyl derivative.

17. A process for the preparation of a supported catalyst system comprising:

(I) reacting a titanium catalyst precursor with a functionalised support in a solvent to bind said titanium catalyst precursor directly to said functionalised support via at least two heteroatoms attached to said support via at least one organic group; (II) impregnating said support with a polymerisation active metal complex; and (III) recovering a supported catalyst as a free-flowing solid or slurry.

* * * * *